33-248. OR 3,187,435 SR SEARCH ROOM

June 8, 1965 G. V. MILLER, JR 3,187,435

TELESCOPE MOUNTS FOR RIFLES

Filed Nov. 16, 1962 3 Sheets-Sheet 1

INVENTOR.
GEORGE V. MILLER, JR.

BY

McMorrow, Berman + Davidson
ATTORNEYS.

1440

1439

2P

INVENTOR.
GEORGE V. MILLER, JR.
BY
McMorrow, Berman + Davidson
ATTORNEYS.

INVENTOR.
GEORGE V. MILLER, JR.
BY
McMorrow, Berman + Davidson
ATTORNEYS.

United States Patent Office 3,187,435
Patented June 8, 1965

3,187,435
TELESCOPE MOUNTS FOR RIFLES
George V. Miller, Jr., Highway 123 South, Seguin, Tex.
Filed Nov. 16, 1962, Ser. No. 238,117
6 Claims. (Cl. 33—50)

This invention relates to means for mounting a telescope on a rifle barrel, and more particularly to an improved telescope mounting assembly provided with means for adjusting a telescope on a rifle for elevation and windage.

A main object of the invention is to provide a novel and improved telescope mounting assembly for a rifle, said assembly being relatively simple in construction, being easy to install, being provided with conveniently accessible means for adjusting the telescope and being arranged to permit removal and replacement of the telescope without disturbing its "zero" setting.

A further object of the invention is to provide an improved adjustable telescope mounting assembly for a rifle, said assembly involving inexpensive parts, being durable in construction, being compact in size, being sleek in appearance, and automatically compensating for all wear when its several adjusting screws are tightened.

Further objects and advantages of the invention will become apparent from the following description and claims, and from the accompanying drawings, wherein:

Figure 1:
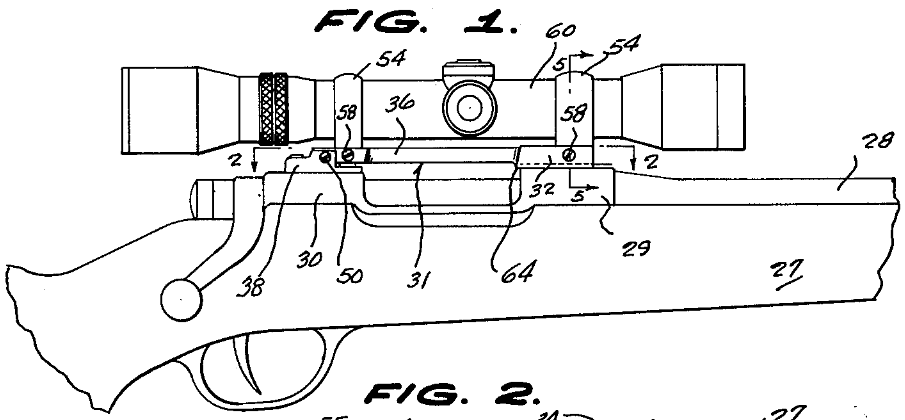
FIGURE 1 is a side elevational view of a portion of a rifle on which is mounted a telescope, the telescope being supported by an improved telescope mounting assembly constructed in accordance with the present invention.
Figure 2:
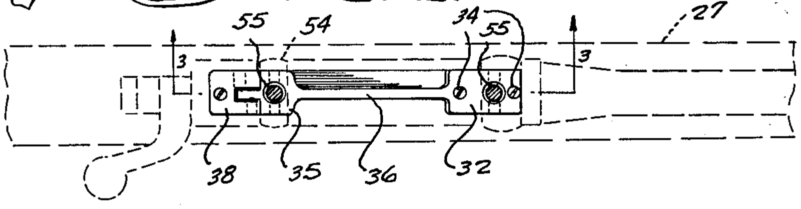
FIGURE 2 is a horizontal cross sectional view taken substantially on the line 2—2 of FIGURE 1.

Referring to the drawings, and more particularly to FIGURES 1 to 6 and 13 wherein a first embodiment of the invention is illustrated, 27 designates a portion of the gun stock of a rifle and 28 designates the barrel of the rifle. Provided at the breech end of the rifle barrel is a receiver ring 29. Rearwardly of the breech opening of the rifle is mounted a receiver bridge 30.

Designated generally at 31 is a telescope mounting assembly according to the present invention, said assembly comprising a base including a front block 32 provided with a pair of counterbored screw holes 33, 33 arranged substantially on the longitudinal center line of the assembly, said screw holes 33 being adapted to receive fastening screws 34, 34 engageable in the receiver ring member 29 for securing the bridge 30 thereto. The base of the mounting assembly also includes a rear block member 35 which is connected integrally to the front block 32 by a longitudinally extending inclined bar element 36.

The rear block member 35 is received on a flat seat 37 formed in an auxiliary block member 38, said auxiliary block member being provided with a pair of screw holes 39, 40 adapted to receive respective fastening screws 41, 42 engageable in the receiver bridge member 30 for securing the auxiliary block 38 thereto. As shown, the screw hole 40 is counterbored to received a correspondingly shaped screw 42, whereas the screw hole 39 is formed with a conical bevel to receive the conical head of the screw 41 so as to present a flush surface on the seat 37 to receive the block 35.

The block 35 is formed with a rearwardly extending vertical tongue 42 which projects from the intermediate portion of the rear edge of the block and which is movably received in a vertical recess 43 formed in the shoulder portion of the auxiliary block 38 adjacent the seat 37.

The tongue 42 is provided with a conical recess 44 on one side thereof and is formed at its bottom rear corner, opposite the recess 44 with a bevel 46 corresponding in shape to about one quarter of the conical recess 44. The conical surface 44 and the bevel surface 46 are longitudinally and vertically offset and define cam surfaces for adjusting the elevation of the block 35, as will be presently described.

As presently mentioned, the tongue 42 is movably receivable in the recess 43 so that it may be adjusted vertically therein. The auxiliary block member 38 is provided on the opposite sides of the recess 43 with the longitudinally and vertically offset tapped bores 47 extending transversely therethrough and threadedly receiving respective adjustable screws 48, said screws being provided with conical inner ends 49.

Figures 3, 4, 5, 6, 13:
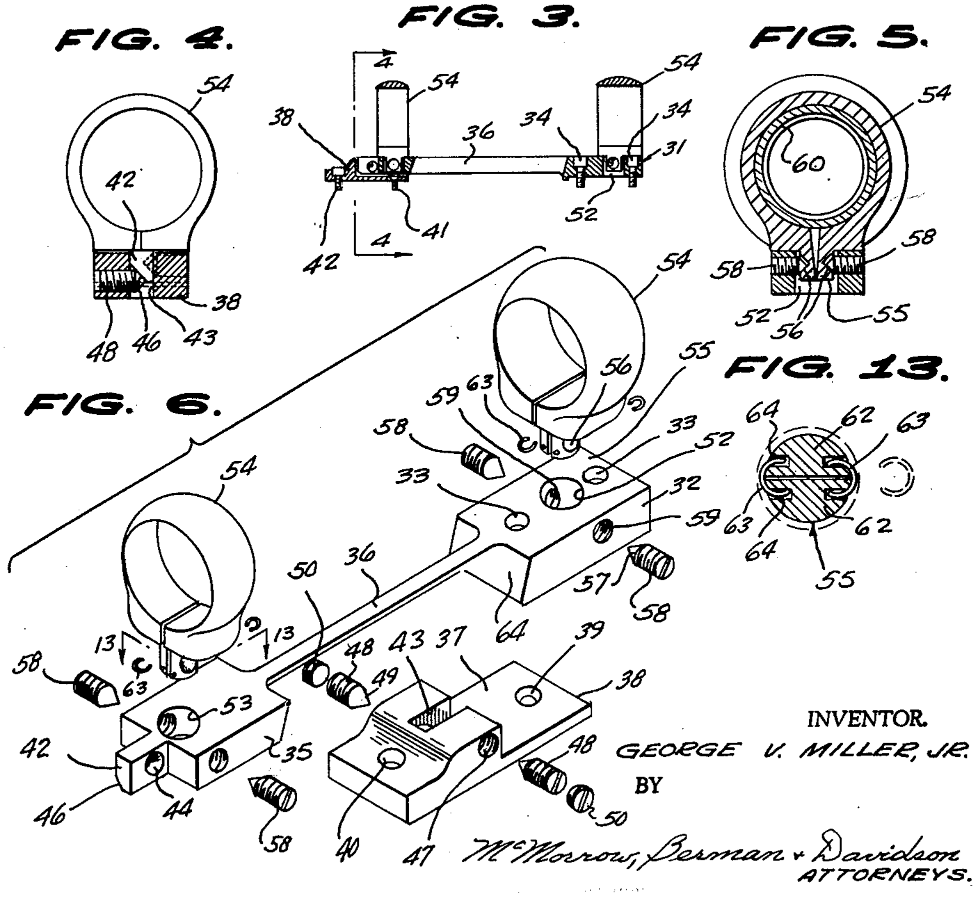
FIGURE 3 is a vertical cross sectional view taken substantially on the line 3—3 of FIGURE 2.
FIGURE 4 is an enlarged transverse vertical cross sectional view taken substantially on the line 4—4 of FIGURE 3.
FIGURE 5 is an enlarged transverse vertical cross sectional view taken substantially on the line 5—5 of FIGURE 1.
FIGURE 6 is a perspective view to an enlarged scale showing the components of the telescope mounting assembly of FIGURES 1 to 5, the parts of the assembly being shown in separated positions.
FIGURE 13 is an enlarged horizontal cross sectional view taken substantially on the line 13—13 of FIGURE 6.

The conical inner ends of the screws are cammingly engageable respectively with the conical recess 44 and the beveled surface 46. The screws 48 are thus cooperable with the surfaces 44 and 46 to clampingly secure the tongue 42 in the recess 43 with camming engagement of the conical inner ends of the screws with the cam surfaces 44 and 46 to adjust the elevation of the rear block 35. As shown in FIGURE 4, the elevation of the rear block may be readily adjusted by loosening the screw 48 on one side of the block 38 and correspondingly tightening the opposite screw. For example, in FIGURE 4, the screw on the right side may be loosened and the screw on the left side may be tightened, whereby the conical end of the screw on the left side acts against the camming surface 46 to elevate the tongue 42 and thereby raise the block 35. The block may be lowered by reversing this procedure.

Respective threaded cover plugs 50, 50 are engageable in the outer ends of the tapped bores 47 to cover said bores, the plugs 50 preferably being provided with outwardly convex end surfaces and being slightly flanged at their outer ends to limit their insertion to a substantially flush position.

The front and rear blocks 32 and 35 are provided along the center line of the assembly with respective vertical bores 52 and 53. Respective front and rear telescope clamping rings 54, 54 are provided, each clamping ring being formed with a depending vertical stud portion 55 which is loosely receivable in a corresponding vertical bore 52 or 53. The studs 55 are formed with diametrically opposed conical recesses 56, 56 which are engageable by the conically pointed ends 57 of respective clamping screws 58 which are threadedly engaged through respective transversely aligned internally threaded bores 59, 59 formed in the side portions of the block 32 and 35 and communicating with the respective vertical bores 52 and 53. Thus, a pair of screws 58, 58 is provided on each of the blocks 32 and 35, the front pair of screws cooperating with the depending stud 55 of the front telescope clamping ring 54 to clamp the stud in a laterally adjusted position, and the screws 58, 58 associated with the rear block 35 similarly clampingly engage the depending stud of the rear telescope ring and similarly clamp said stud in laterally adjusted position. The clamping screws 58 may thus be employed to provide windage adjustments.

As seen in FIGURE 5, the depending studs 55 have considerable lateral clearance in the bores 52 and 53 so that the associated telescope clamping ring 54 has a substantial range of lateral adjustment.

In the specific embodiment illustrated in FIGURES 1 to 6 and 13, the clamping rings 54 and their associated integral studs are split in a vertical longitudinal plane extending through the bottom portions of the rings and the center lines of the studs, as viewed in FIGURE 6, whereby the rings are made yieldable to allow them to be easily mounted around a telescope 60 to surround the central portion of the telescope in the manner illustrated in FIGURE 1. The depending stud segments, shown at 62, 62 in FIGURE 13 are resiliently secured together after the rings have been engaged on the telescope by means of opposing C-shaped spring clips 63, 63 engaged in respective pairs of recesses 64, 64 formed to receive the ends of the rings, the recesses 64, 64 being located on opposite sides of the plane of separation of the stud segments. The spring clips 63 hold the stud segments together with the rings 64 clampingly engaged around the intermediate portion of the telescope 60 to facilitate the placement of the studs in the respective vertical bores 52 and 53 and their subsequent lateral adjustment by the respective pairs of opposing clamping screws 58, 58. When the clamping rings 54 are in place on the mount base, the opposing lateral-adjustment screws 58, 58 serve to grip the stud segments and clamp the rings rigidly around the telescope tube when tightened. Also, the axes of the conical recesses 56 are located slightly higher than the axis of the lateral-adjustment screws 58, so that as the screws are tightened in the recesses 56, the clamping rings are pulled down into clamping engagement with the mount base, as well as tightened around the telescope tube.

The primary purpose of the constricting springs or clips 63, 63 is to maintain the position of the bottom-split clamping rings on a telescope when it is removed from a rifle. Thus, a telescope may be removed and replaced on a rifle and "zero" maintained so long as one is aware of the position of at least one of the two screws 58 accommodating each ring when it is in "zero" position on the mount base. If the rings were left loose when the telescope is removed, it would be necessary each time to check the reticle (cross hairs) of the telescope for cant and to rezero-in the firearm when the telescope is replaced, aside from making necessary corrections for possible longitudinal movements of the telescope in the clamping rings.

It will be noted that the rear edge of the front block member 32 is upwardly and forwardly inclined, as shown at 64, whereby to define a recoil shoulder which projects rearwardly beyond and overlies the rear end of the receiver ring 29.

The telescope mounting rings may be of varying construction in accordance with the present invention. Thus, they may be split at locations other than at the specific location illustrated in the embodiment shown in FIGURES 1 to 6 and 13, as will be presently explained.

Referring now to the form of the invention illustrated in FIGURES 7 to 12, the telescope mounting assembly is designated generally at 31' and comprises the front block member 32' and the rear block member 35' integrally connected by the longitudinally extended inclined bar member 36'. The front block member 32' is formed with a pair of counterbored screw holes 33', 33' adapted to receive fastening screws 34', 34', for securing the front block 32' to the receiver ring 29 of a rifle. The rear block member 35' is similarly provided with a counterbored screw hole 40' adapted to receive a fastening screw 42' for securing the rear block member 35' directly to the receiver bridge 30 of a rifle.

Figure 10:
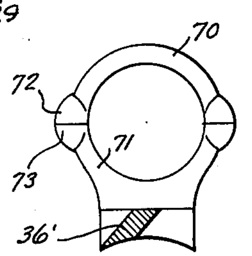
FIGURE 10 is a transverse vertical cross sectional view taken substantially on the line 10—10 of FIGURE 7.
Figure 11:
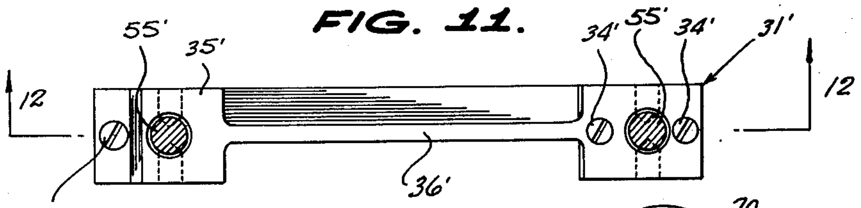
FIGURE 11 is a horizontal cross sectional view taken substantially on the line 11—11 of FIGURE 7.
Figure 12:
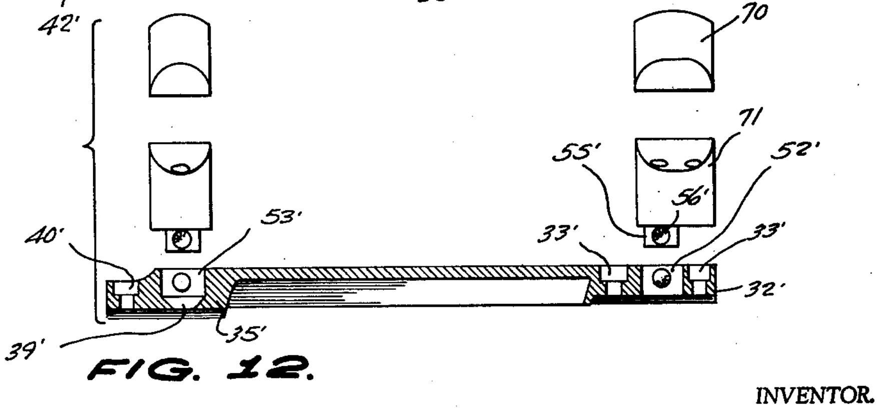
FIGURE 12 is a vertical cross sectional view taken substantially on the line 12—12 of FIGURE 11, with the parts of the assembly shown in separated positions.

As shown in FIGURE 11, the fastening screws 34', 34', and 42' and the longitudinally extending bar member 36' are substantially aligned at least at the top plane of the base of the mounting assembly, the bar member 36' being inclined downwardly and laterally from the longitudinal center line of the assembly toward the left bottom margin thereof, as shown in FIGURE 10.

The front and rear blocks 32' and 35' are formed with respective vertical bores 52' and 53' which loosely receive the depending vertical studs 55' of respective front and rear telescope mounting ring assemblies 54', 54'. Each stud 55' is formed with diametrically opposed conical recesses 56', 56' which receive the conical inner ends of respective diametrically opposed pairs of adjusting and clamping screws 58', 58' which may be used in the manner described in connection with the previously disclosed form of the invention to adjust the telescope mounting rings 54′ laterally on the base blocks 32′ and 35′ to provide windage adjustments.

The mounting rings 54′ are split at their horizontal center planes, thereby defining substantially semicircular top and bottom segments 70 and 71, the bottom segment 71 being provided with the depending vertical studs 55′.

The rear block 35′ is formed with a conically beveled screw hole 39′ at the bottom of the vertical bore 53′, said beveled screw hole receiving the conical head of a fastening screw 41′ which is employed in conjunction with the fastening screw 42′ to securely fasten the rear block member 35′ to the receiver bridge 30.

Figure 9:
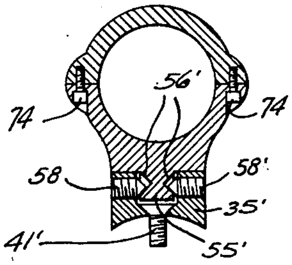
FIGURE 9 is a transverse vertical cross sectional view taken substantially on the line 9—9 of FIGURE 7.

The ring segments 70 and 71 are provided with enlarged side portions 72, 73 through which are engaged headed fastening screws 74 to clamp the segments together in the manner clearly illustrated in FIGURE 9.

As will be readily apparent, the ring members may be easily engaged around the intermediate portion of the telescope 60 by first engaging said intermediate portion with the lower ring segments 71, after which the upper ring segments 70 are fastened to the lower ring segments by means of the fastening screws 74, 74. The screw holes are not drilled completely through so that from most conventional viewpoints no screws are visible.

The bottom surfaces of the block members 32′ and 35′ are suitably concaved to conform with the externally convex shape of the top surfaces of the elements 29 and 30 on which the block members are mounted.

FIGURES 14 to 17 illustrate a further modified form of telescope mounting ring which may be employed as a part of the improved telescope mounting assembly of the present invention. Thus, the mounting ring, designated generally at 75 in FIGURES 14 to 17 comprises a pair of mating opposing segments 76, 76 of generally semicircular shape having thickened base portions 77 provided with the mating generally semicylindrical stud segments 78 similar to the stud segments 62, 62 of the ring employed in the embodiment of FIGURES 1 to 6 and 13. Thus, the stud segments may be provided with recesses 64 to receive C-shaped spring clips 63, as in FIGURE 13.

The top ends of the segments 76, 76 are provided with semicircular mating half-collar elements 79, 79 which when brought together, define a substantially annular collar element, the segments being internally threaded to define a threaded bore, when the segments are brought together, adapted to threadedly receive the headed screw 80. An annular washer 81 is engageable over the segments 79, 79 to hold them together in mating relationship, the collar 81 being centrally formed with a frusto conical aperture to receive the correspondingly shaped frusto conical head 82 of the screw 80. Screw 80 may be rigidly secured in coller 81 or may be made integral therewith. The screw 82 thus locks the retaining collar 81 in position holding the top ends of the segments 76, 76 together after the segments have been engaged around a telescope 60, whereby the ring assemblies 75 are thus secured on the telescope preparatory to mounting the same on a rifle. The depending stud segments 78 are provided with the respective conical recesses 56 similar to those provided on the depending stud segments 55 of the rings 54 of FIGURES 1 to 6 and 13.

Figures 14, 15, 16, 17, 18, 19, 20, 21, 22, 23, 24, 25, 26:
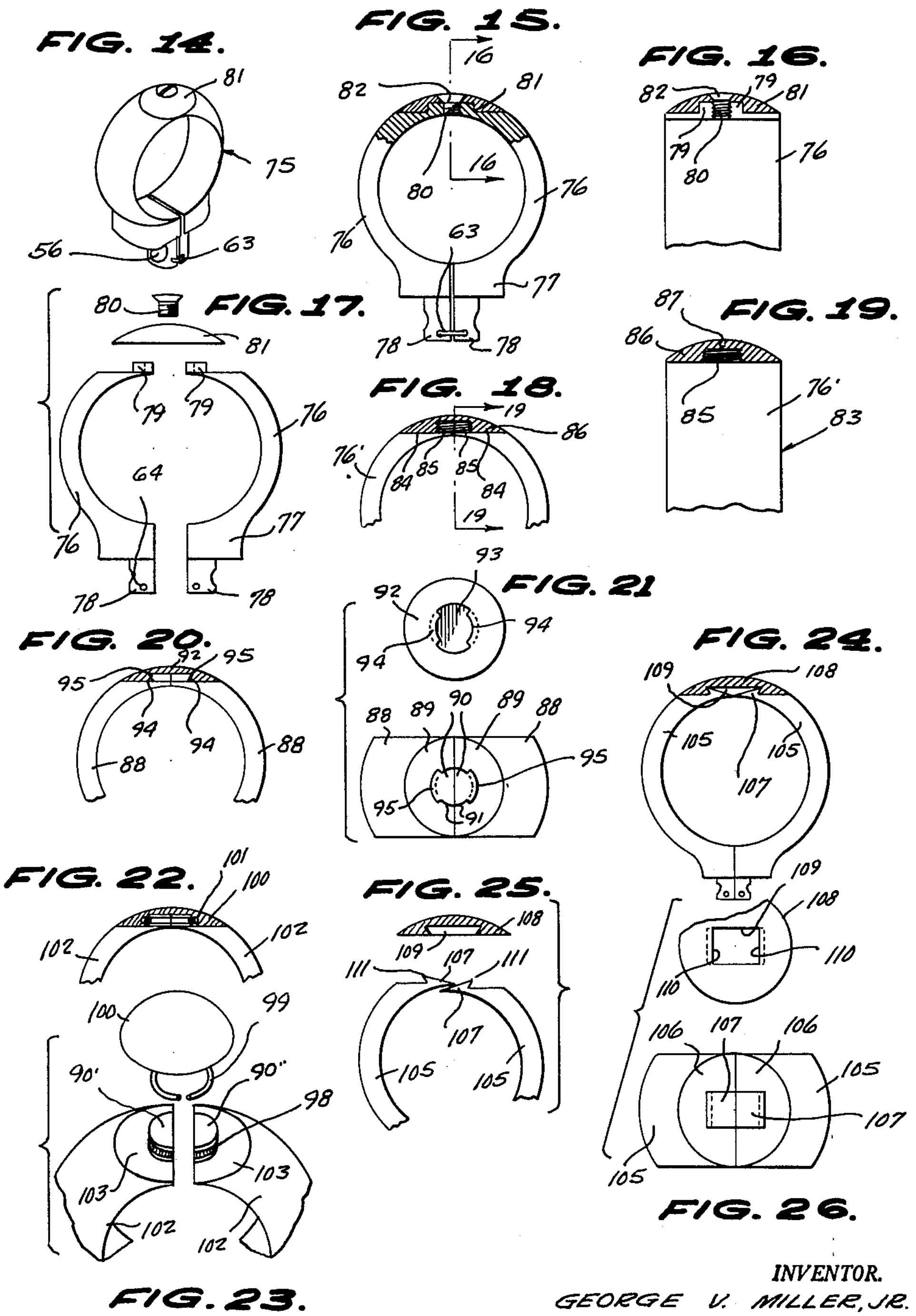
FIGURE 14 is a perspective view of a modified form of telescope mounting ring which may be employed in a mounting assembly according to the present invention.
FIGURE 15 is an enlarged front elevational view, partly in vertical cross section, of the mounting ring shown in FIGURE 14.
FIGURE 16 is a fragmentary vertical cross sectional view taken substantially on the line 16—16 of FIGURE 15.
FIGURE 17 is a front elevational view showing the components of the mounting ring of FIGURES 14 to 16 in separated positions.
FIGURE 18 is a fragmentary front elevational view, partly in vertical cross section, showing the upper portion of a further modified form of telescope mounting ring which may be employed in an assembly according to the present invention.
FIGURE 19 is a vertical cross sectional view taken substantially on the line 19—19 of FIGURE 18.
FIGURE 20 is a fragmentary front elevational view, partly in vertical cross section, similar to FIGURE 18, but showing a further modification of a telescope mounting ring which may be employed in the assembly of the present invention.
FIGURE 21 is a top plan view of the mounting ring of FIGURE 20 shown with its fastener removed, the fastener being shown in bottom plan view.
FIGURE 22 is a fragmentary front elevational view, partly in vertical cross section, similar to FIGURE 20, but showing a further modification of a telescope mounting ring which may be employed in the assembly of the present invention.
FIGURE 23 is a perspective view showing a fragmentary portion of the mounting ring of FIGURE 22 with the associated fastening elements employed therewith, the elements being shown separated from the mounting ring.
FIGURE 24 is a front elevational view, partly in vertical cross section, showing a further modification of a telescope mounting ring which may be employed in the assembly of the present invention.
FIGURE 25 is a fragmentary front elevational view of the mounting ring of FIGURE 24 shown with its associated fastening member, the fastening member being shown spaced from the mounting ring and in vertical cross section.
FIGURE 26 is a top plan view of the telescope mounting ring of FIGURE 24, shown with its fastening member spaced therefrom and in fragmentary bottom plan view.

Referring now to the form of the mounting ring shown in FIGURES 18 and 19, the mounting ring is designated generally at 83 and comprises opposing segments 76′, 76′ having the depending stud portions similar to those of the form of mounting ring shown in FIGURES 14 to 17. The segments 76′, 76′ are formed at their top ends with flattened surfaces 84, 84 and with externally threaded half stud segments 85, 85 which are adapted to be brought together in the manner illustrated in FIGURE 18, to define an externally threaded unitary stud located on the vertical center line of the assembly. Threadedly engaged on the composite vertical stud thus defined is a fastening nut 86 of externally convex shape, conforming in shape with the curvature of the adjacent portions of the segments 76′, 76′, the nut being in the form of a cap adapted to cover the top ends of the stud segments 85, 85 and being provided with a transverse screwdriver groove 87 in its top wall to facilitate the tightening of the nut on the mated stud segments by the use of a conventional screwdriver.

In the form of the mounting ring shown in FIGURES 20 and 21, the top ends of the opposing segments, shown at 88, 88 are formed with flat surfaces 89, 89 and with mating upstanding lugs 90, 90 which are notched away at their adjacent portions, as shown at 91, 91 to define opposing clearance notches when the lugs 90, 90 are brought together, as shown in FIGURE 21. A circular cap member 92 is formed with a central circular recess 93 having opposing locking flanges 94, 94 which are engageable through the clearance notches defined by the notched segments 91, 91, after which the cap member 92 may be rotated to an angle of 90° to bring the locking flanges 94, 94 beneath the undercut lug portions 95, 95, as shown in FIGURE 20, to lock the lugs 90, 90 together. The top surface of the cap member 92 is rounded to conform with the curvature of the adjacent external surface portions of the segments 88, 88, whereas the bottom surface of the cap 92 is flat so that it will conform with the flat top surfaces 89, 89 of the respective segments 88, 88. The lower end portions of the segments 88, 88 are formed in the same manner as the segments 76, 76 of FIGURES 17 and 18. Cap member 92 can easily be twisted into locking position with the thumb, since ring halves 88 will not be rigidly snug about the telescope tube until finally clamped in the mount base by the lateral-adjustment screws 58. If necessary a small pin may be provided on one side of one of the mating upstanding lugs 90, 90 so as to define a stop engageable by the end of a flange 94 when the cap member 92 is twisted into proper locking position.

In the form of mounting ring shown in FIGURES 22 and 23, the upstanding semicircular top lug segments 90′, 90′ are peripherally grooved, as shown at 98, to receive a resilient split ring 99 to clamp the semicircular lug segments 90′, 90′ together to define a composite circular lug. The circular fastening cap 100 is lockingly engageable over the lug segments and the clamping ring 99 in the manner illustrated in FIGURE 22, the cap 100 having a central bottom cavity formed with an undercut circular peripheral groove 101 which is lockingly engageable over and which receives the ring 99 when the cap is forced down over the stud segments 90′, 90′. The exterior surface of the cap 100 is smoothly curved to conform with the convex external curvature of the adjacent surfaces of the mounting ring segments, shown at 102, 102. The bottom surface of the cap 100 is flat, to conform with the flat top surfaces 103, 103 of the mounting ring segments 102, 102. The segments 102, 102 are provided with depending stud segments similar to those shown in the mounting ring illustrated in FIGURES 17 and 18. When the mounting ring segments 102 are engaged around the barrel of a telescope 60, the top ends of the segments are first secured together by mean of the spring clamping ring 99 engaged around the abutting stud segments 90′, 90′, after which the retaining head 100 is snapped over the secured semicircular abutting stud segments 90′, 90′ to provide the resultant assembly shown in FIGURE 22.

Referring now to the form of mounting ring assembly shown in FIGURES 24, 25 and 26, the respective mounting ring segments 105, 105 are formed at their top ends with the symmetrically related semicircular flat top surface portions 106, 106 and are formed with the rectangular lug segments 107, 107 at the centers of the semicircular flat areas 106. The lug segments 107, 107 are of generally triangular shape in cross section, substantially defining a dovetailed shaped composite lug when the segments 105, 105 are brought together in the manner illustrated in FIGURE 26. A circular retaining cap 108 is provided with a bottom recess 109 having the undercut side edge portions 110, 110 adapted to lockingly receive respective undercut side locking rib portions 111, 111 of the rectangular lugs 107, 107. Thus, the segments 105, 105 are engaged around the barrel of a telescope 60, after which the top lugs 107, 107 are aligned with each other as closely as possible namely, to the condition substantially illustrated in FIGURE 25, after which the retaining cap 108 is engaged over the lug segments 107, 107, by forcing the segments into the cavity 109 to bring the ribs 111, 111 into locking engagement with the undercut side edge portions 110, 110 of the cap.

As shown in FIGURE 24, the cap is convexly curved at its top surface to substantially conform with the convex external curvature of the adjacent portions of the ring segments 105, 105. The lower portions of the ring segments 105, 105 are provided with depending semicylindrical lug segments similar to those provided on the ring segments 76, 76 in FIGURE 17.

Figure 7:
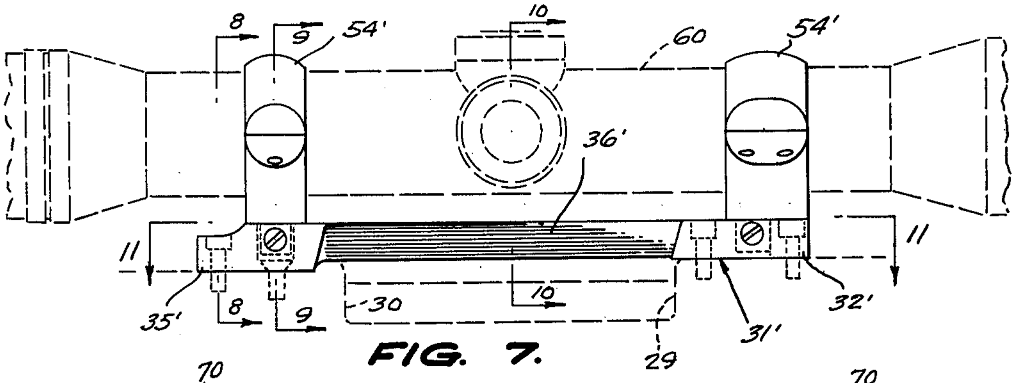
FIGURE 7 is a side elevational view of a modified form of telescope mounting assembly constructed in accordance with the present invention.
Figure 8:
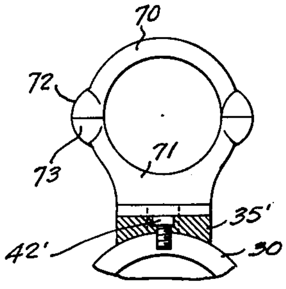
FIGURE 8 is a transverse vertical cross sectional view taken substantially on the line 8—8 of FIGURE 7.

As will be readily apparent, the location of the connecting bar 36 in the arrangement of FIGURE 1, and the similar location of the connecting bar in the arrangement of FIGURE 7, provides clearance at one side of the breech opening of the rifle, inasmuch as the connecting bar is inclined downwardly and laterally from the longitudinal center line connecting the front and rear blocks. Thus, the front and rear blocks are rigidly connected together by a bar which is laterally offset and is thus substantially non-interfering with respect to the breech portion of the rifle.

As previously mentioned, the lateral adjustment conical screws 58, in addition to clamping the depending studs and providing windage adjustments, also clamp the telescope mounting rings rigidly onto the mounting base blocks when tightened due to the fact that the axes of the conical recesses in the depending studs are located slightly higher than the axes of the screws. Also, the mount permits accurate return to "zero" each time the telescope is replaced after removal as long as one notes and remembers the position of at least one of the cone-ended screws 58, 58 associated with each telescope ring. A small mark may be provided on the outer end of each screw to facilate recording the position of the screws.

It will be further noted that all wear is automtically compensated for when the cone-ended adjustment screws of the various embodiments above described are tightened into clamping positions.

While certain specific embodiments of a telescope mounting assembly for rifles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A telescope mounting assembly for rifles comprising a base including a front block adapted to be attached to the receiver ring of a rifle and a rear block adapted to be attached to the receiver bridge of the rifle, said front and rear blocks being formed with respective vertical bores, respective front and rear telescope clamping rings, depending studs on said clamping rings extending loosely into said vertical bores, and respective pairs of opposing adjusting screws threadedly engaged through the sides of the blocks and being clampingly engageable on opposite sides of said studs, whereby the clamping rings may be adjusted laterally and clamped by said screws to provide windage adjustments, said clamping rings and studs being split at vertical longitudinal planes extending through the center lines of the studs to define opposing ring and stud segments, said screws having conically shaped inner ends and the stud segments being formed with conical recesses receiving said conically shaped inner ends.

2. A telescope mounting assembly for rifles comprising a base including a front block adapted to be attached to the receiver ring of a rifle and a rear block adapted to be attached to the receiver bridge of the rifle, said front and rear blocks being formed with respective vertical bores, respective front and rear telescope clamping rings, depending studs on said clamping rings extending loosely into said vertical bores, and respective pairs of opposing adjusting screws threadedly engaged through the sides of the blocks and being clampingly engageable on opposite sides of said studs, whereby the clamping rings may be adjusted laterally and clamped by said screws to provide windage adjustments, said clamping rings and studs being split in a vertical longitudinal plane extending substantially through the bottom portions of the rings and the center lines of the studs, to define opposing ring and stud segments, said screws respectively engaging and clamping the ring and stud segments together.

3. A telescope mounting assembly for rifles comprising a base including a front block adapted to be attached to the receiver ring of a rifle and a rear block, said front and rear blocks being formed with respective vertical bores, respective front and rear telescope clamping rings, depending studs on said clamping rings extending loosely into said vertical bores, respective pairs of opposing adjusting screws threadedly engaged through the sides of the blocks and being clampingly engageable on opposite sides of said studs, whereby the clamping rings may be adjusted laterally and clamped by said screws to provide windage adjustment, said rear block being provided with a vertical tongue formed with vertically offset cam surfaces in its opposite sides, an auxiliary block adapted to be attached to the receiver bridge of the rifle and disposed subjacent said rear block and formed with a vertical recess receiving said tongue, and respective screws threadedly engaged through the sides of said auxiliary block and having conical inner ends engaged with said cam surfaces and being cooperable to clampingly secure said tongue with camming engagement of the conical inner ends of the screws with said cam surfaces to adjust the elevation of said rear block.

4. A telescope mounting assembly for rifles comprising a base including a front block adapted to be attached to the receiver ring of a rifle and a rear block, said front and rear blocks being formed with respective vertical bores, respective front and rear telescope clamping rings, depending studs on said clamping rings extending loosely into said vertical bores, respective pairs of opposing adjusting screws threadedly engaged through the sides of the blocks and being clampingly engageable on opposite sides of said studs, whereby the clamping rings may be adjusted laterally and clamped by said screws to provide windage adjustments, said rear block being provided with a vertical tongue formed with vertically offset cam surfaces in its opposite sides, an auxiliary block adapted to be attached to the receiver bridge of the rifle and disposed subjacent said rear block and formed with a vertical recess receiving said tongue, respective screws threadedly engaged through the sides of said auxiliary block and having conical inner ends engaged with said cam surfaces and being cooperable to clampingly secure said tongue with camming engagement of the conical inner ends of the screws with said cam surfaces to adjust the elevation of said rear block, and an inclined longitudinally extending bar integrally connecting said front and rear blocks and extending downwardly and laterally from the intermediate longitudinal vertical central plane of the blocks.

5. A telescope mounting assembly for rifles comprising a base including a front block adapted to be attached to the receiver ring of a rifle and a rear block, said front and rear blocks being formed with respective vertical bores, respective front and rear telescope clamping rings, depending studs on said clamping rings extending loosely into said vertical bores, respective pairs of opposing adjusting screws threadedly engaged through the sides of the blocks and being clampingly engageable on opposite sides of said studs, whereby the clamping rings may be adjusted laterally and clamped by said screws to provide windage adjustments, said clamping rings and studs being split in a vertical longitudinal plane, said screws clamping the ring and stud segments together, said rear block being provided with a vertical tongue formed with vertically offset cam surfaces in its opposite sides, an auxiliary block adapted to be attached to the receiver bridge of the rifle and disposed subjacent said rear block and formed with a vertical recess receiving said tongue, respective screws threadedly engaged through the sides of said auxiliary block and having conical inner ends engaged with said cam surfaces and being cooperable to clampingly secure said tongue with camming engagement of the conical inner ends of the last-named screws with said cam surfaces to adjust the elevation of said rear block, and an inclined longitudinally extending bar rigidly connecting said front and rear blocks, said bar being inclined downwardly and laterally from the longitudinal center line connecting the top surfaces of the blocks.

6. The structure of claim 1, wherein the axes of said conical recesses are spaced above the axes of said screws, whereby said screws exert downward clamping force on the stud segments with respect to said blocks when the screws are tightened.

References Cited by the Examiner

UNITED STATES PATENTS

| | | | |
|---|---|---|---|
| 2,043,430 | 6/36 | Doe | 33—50 |
| 2,073,210 | 3/37 | Horsrud | 33—50 |
| 2,548,031 | 4/51 | Loupold | 33—50 |
| 2,743,526 | 5/56 | Ivy | 33—50 |
| 2,951,292 | 9/60 | Buehler | 33—50 |

FOREIGN PATENTS

| | | |
|---|---|---|
| 1,112,426 | 8/61 | Germany. |

ISAAC LISANN, *Primary Examiner.*